US012726726B2

(12) United States Patent
Sun et al.

(10) Patent No.: US 12,726,726 B2
(45) Date of Patent: Sep. 1, 2026

(54) VIDEO CAPTURE BY MULTIPLE COLLABORATING DEVICES

(71) Applicant: Samsung Electronics Co., Ltd., Suwon-si (KR)

(72) Inventors: Lin Sun, Sunnyvale, CA (US); Kushal Kardam Vyas, Santa Clara, CA (US); Jihee Kim, Mountain View, CA (US); Insun Kim, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 162 days.

(21) Appl. No.: 18/527,323

(22) Filed: Dec. 3, 2023

(65) Prior Publication Data

US 2025/0184621 A1 Jun. 5, 2025

(51) Int. Cl.
*H04N 23/90* (2023.01)
*G06T 7/12* (2017.01)
*G06T 7/70* (2017.01)

(52) U.S. Cl.
CPC ............... *H04N 23/90* (2023.01); *G06T 7/12* (2017.01); *G06T 7/70* (2017.01); *G06T 2207/30201* (2013.01)

(58) Field of Classification Search
None
See application file for complete search history.

(56) References Cited

U.S. PATENT DOCUMENTS 9,437,247 B2 9/2016 Pendergast
9,570,107 B2 2/2017 Boiman
10,313,692 B2 6/2019 Liu
10,554,850 B2 2/2020 Townsend
11,120,638 B2 9/2021 Sun
11,570,378 B2 1/2023 Newman
(Continued)

FOREIGN PATENT DOCUMENTS

CN 110523085 12/2019
JP 2007-221452 A 8/2007
(Continued)

OTHER PUBLICATIONS

Quentin Galvane. Automatic Cinematography and Editing in Virtual Environments. Graphics [cs.GR]. Grenoble 1 UJF—Université Joseph Fourier, Dec. 2015. English. ffNNT : ff. fftel-01229590f (available at https://inria.hal.science/tel-01229590/file/main.pdf).
(Continued)

*Primary Examiner* — Samira Monshi

(57) ABSTRACT

In one embodiment, a method includes synchronizing, by a camera device, a clock of the camera device to a shared clock time and applying, by the camera device, one or more shared camera parameters to a camera of the camera device. The method further includes determining, by the camera device, a position of the camera device relative to at least one of one or more peer camera devices capturing video of a scene in an environment of the camera device; capturing, by the camera of the camera device, a video of the scene in the environment of the camera device; and transmitting, by the camera device, the captured video of the scene to at least one of the one or more peer camera devices to form a composite video of the scene.

20 Claims, 8 Drawing Sheets

(56) References Cited

U.S. PATENT DOCUMENTS

| | | | | |
|---|---|---|---|---|
| 11,574,477 | B2 | 2/2023 | Wu | |
| 2011/0025853 | A1* | 2/2011 | Richardson | H04N 23/66 348/E7.085 |
| 2012/0162436 | A1 | 6/2012 | Cordell | |
| 2014/0293013 | A1 | 10/2014 | Gong | |
| 2021/0027496 | A1* | 1/2021 | Koyama | G06T 7/73 |
| 2022/0070371 | A1 | 3/2022 | Bushman | |

FOREIGN PATENT DOCUMENTS

| | | | |
|---|---|---|---|
| JP | 2019-102845 | A | 6/2019 |
| KR | 10-0744475 | B1 | 8/2007 |
| KR | 10-2014-0056562 | A | 5/2014 |
| KR | 101950674 | | 5/2019 |
| KR | 20190083905 | | 7/2019 |
| KR | 20210050192 | A | 5/2021 |
| KR | 102354918 | | 1/2022 |

OTHER PUBLICATIONS

Huawei multi-camera mode (https://www.huaweicentral.com/harmonyos-multi-camera-mode-everything-you-need-to-know/), Accessed on Oct. 13, 2023.

XiaoMi multi-camera mode, YouTube clip titled “Xiaomi 2021 New Product Launch Mar. 29, 2021” uploaded by user IE Tech, at 1:26:58-1:28:48. Retrieved from Internet: https://www.youtube.com/watch?v=s6c-Gqd1QhE&ab_channel=IETECH.

AutoPod (https://www.autopod.fm/), Accessed on Oct. 13, 2023.

International Search Report and Written Opinion in International Application No. PCT/KR2024/004807.

* cited by examiner

VIDEO CAPTURE BY MULTIPLE COLLABORATING DEVICES

TECHNICAL FIELD

This application generally relates to capturing video by multiple collaborating devices.

BACKGROUND

Many electronic devices include one or more cameras. For example, most smartphones include one or more cameras capable of capturing still images and video content. Laptops, tablets, wearables, and other electronic devices often include one or more cameras. Cameras are also included in many stand-alone electronic devices, such as webcams, conventional point-and-shoot cameras, and video cameras. An electronic device that includes one or more cameras is referred to herein as a "camera device."

DESCRIPTION OF EXAMPLE EMBODIMENTS

Videos are typically taken by a single camera and from a single perspective. However, video from multiple cameras and from multiple perspectives can create a richer video experience. For example, video frames that are taken from different perspectives can be stitched together to create a composite video. Such composite videos can provide views of a scene from a variety of angles, providing the viewer with a better overall perspective of the scene. In addition, video created by selecting from frames from multiple perspectives can overcome problems such as when an object or other visual artifact (e.g., an out of focus camera) degrades a particular view, as video frames from a different view can be used during those times. Video from multiple perspectives can also present information that cannot be presented, or is difficult to present, from a single perspective. For example, video from multiple perspectives can show a conversation between two people sitting across from each other yet have the speaker always looking in the direction of the camera, or can show a person explaining how to perform a task from one perspective (e.g., facing the speaker) and show the task being performed from a different perspective (e.g., from a top-down perspective, focused on the speaker's hands). Video from multiple perspectives, and the ability to create a composite video by selecting from streams from multiple perspectives, can enhance visual quality, flexibility and storytelling possibilities.

Setting up multiple cameras to capture video from multiple perspectives is a time-consuming manual process that typically requires the expertise of professionals to perform properly. In such setups, video is captured from several devices, and after video capture is complete, one or more professionals manually review the video and stitch together frames from different views to create a composite video. Video captured by multiple cameras typically requires users to upload each video footage to a professional video editing software and then edit footage manually on a computing device such as a desktop or laptop. Moreover, existing multi-camera setups often require users to select among available perspectives by assigning each camera a name or identifier, which can lead to confusions during video recording, especially when users are limited in time and find it challenging to associate device names with their physical locations or have difficulty remembering the mappings between device names and physical camera locations.

Figure 1:
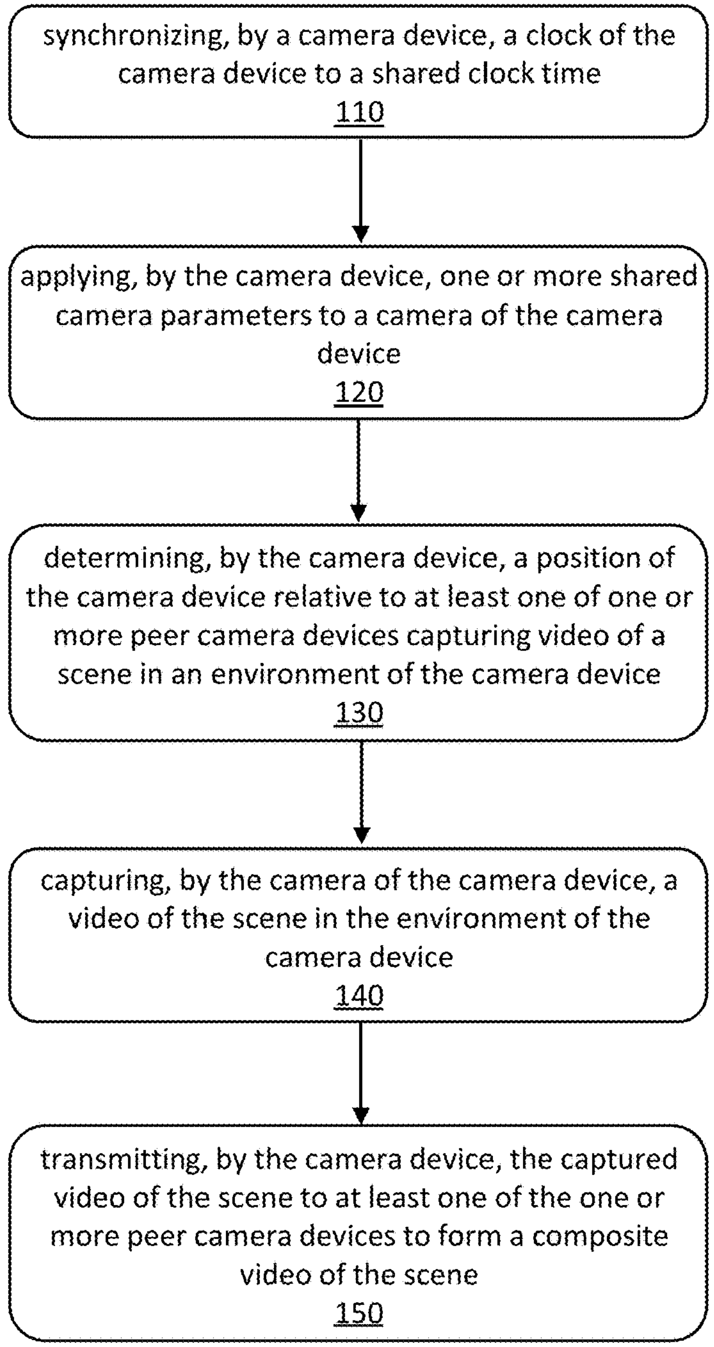
FIG. 1 illustrates an example method for capturing video by multiple collaborating camera devices.
Figure 2:
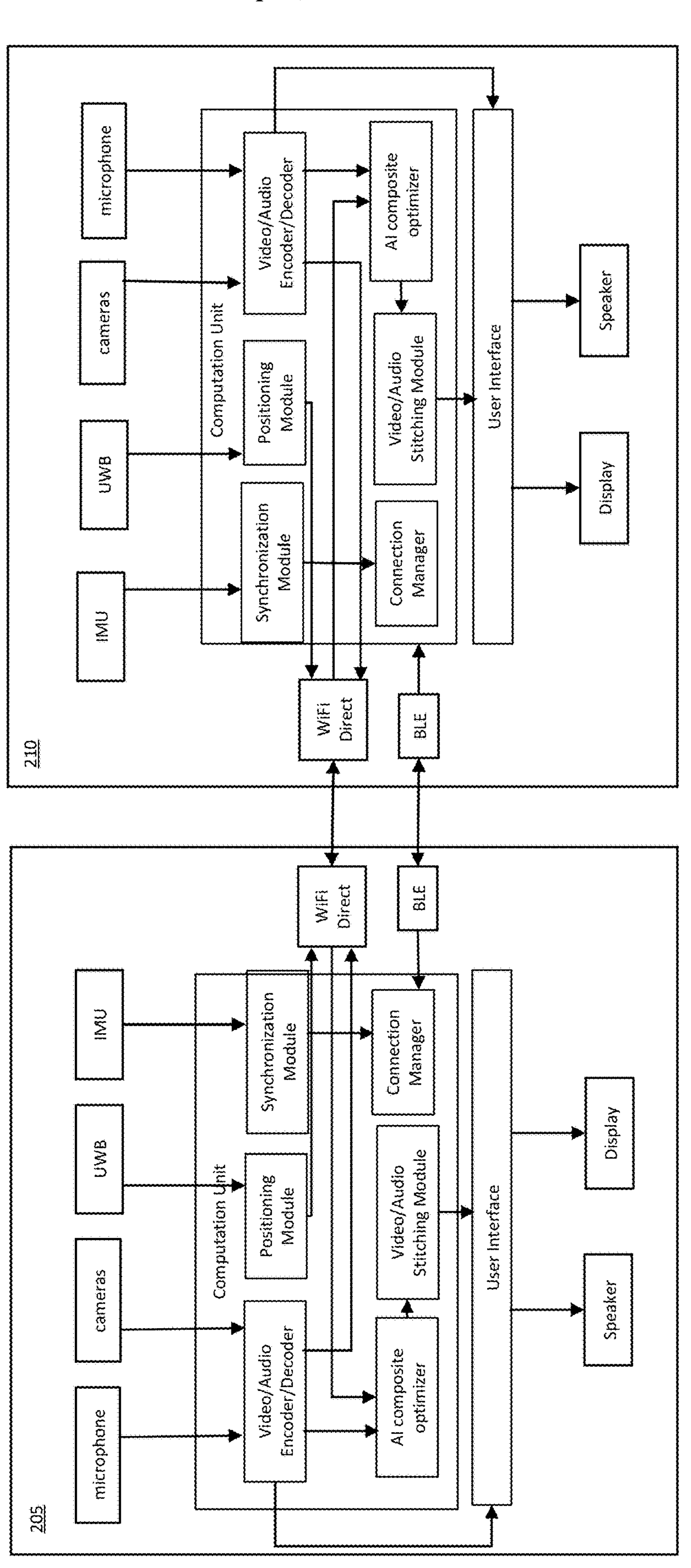
FIG. 2 illustrates an example architecture of two camera devices collaborating in a multi-camera session.

In contrast, embodiments of this invention provide for seamless capture, review, editing, and/or compilation of video and audio captured by multiple camera devices. FIG. 1 illustrates an example method for capturing video by multiple collaborating camera devices. FIG. 2 illustrates, among other things, two camera devices collaborating in a multi camera session. The camera devices may be any suitable electronic device that include one or more cameras, such as smartphones, wearables, webcams, cameras, appliance (e.g., refrigerator) cameras, VR/AR headsets, etc. FIG. 2 illustrates two camera devices: camera device 205 and camera device 210. Each device includes varies sensors, including one or more cameras for capturing video and a microphone, e.g., for capturing audio accompanying a video.

Step 110 of the example of FIG. 1 includes synchronizing, by a camera device, a clock of the camera device to a shared clock time. The clock of each device determines that device's time, and is used to temporally synchronize video frames from different devices. For example, before or after joining a multi-camera session, each camera device may update its clock through a cellular signal, GPS signal, Wi-Fi signal, or other suitable mode. As a result, each device's clock in the multi-camera session is synchronized, for example up to a particular level of precision (e.g., synchronized at the microsecond level). In particular embodiments, a time stamp is embedded with video metadata on a frame-by-frame basis, therefore enabling temporal synchronization among video frames from different camera devices. Moreover, in particular embodiments camera devices may be free to join or leave a session while the session is in progress without disrupting video capture and collaboration of any other camera deices in the session, and synchronized clocks ensure that a camera device joining an in-progress session or leaving an in-progress session (or both) can still contribute the video it captured for the duration it was participating in the session.

Step 120 of the example method of FIG. 1 includes applying, by the camera device, one or more shared camera parameters to a camera of the camera device. In particular embodiments, the shared camera parameters include one or more of a camera orientation, a capture frequency (e.g., in frames per second), a resolution, color grade, and white balance. Each device in the multi-camera setup applies the same camera parameters so that video quality and visual aspects across devices in the session are consistent with each other. In particular embodiments, if a device cannot adopt one or more required camera parameters for a multi-camera session, then that device may be excluded from the session.

In particular embodiments, a multi-camera setup may include one primary device. For example, device 205 may be a primary device, and device 210 (along with all other devices in the multi-camera session) may be secondary devices. In particular embodiments, each secondary device adopts the camera parameters set by a primary device. For example, step 120 of the example method of FIG. 1 may include receiving the shared camera parameters from a primary device and then applying those parameters. From the perspective of the primary device, step 120 may include simply applying its own parameters for video capture.

As illustrated in the example of FIG. 2, the orientation of a particular camera device may be determined by an inertial measurement unit (IMU) on that camera device, which may include an accelerometer and a gyroscope. In particular embodiments, a primary device may transmit its camera parameters to other camera devices using a synchronization module. For the primary device, a synchronization module can collect that camera device's camera parameters and send those parameters to a connection manager, which can use a transmitter to transmit those parameters to other camera devices in the multi-camera session. For instance, in the example of FIG. 2, camera device 205 and camera device 210 may use a Bluetooth low energy (BLE) communication module to transmit and receive camera parameters, although this disclosure contemplates that any suitable communication module may be used. A secondary device may receive camera parameters from a primary device (or, in particular embodiments, from another secondary device that has those parameters), and after receiving those parameters at a connection manager, can transmit the parameters to that device's synchronization module to implement the parameters for that device's camera. In particular embodiments, applying camera parameters can include presenting an instruction to a user to adjust the orientation of their camera device to match the orientation specified by the shared camera parameters.

In particular embodiments, a primary device may be designated prior to video capture, for example at the beginning of a multi-camera session. In particular embodiments, the primary device may be the device that starts the session.

In particular embodiments, a communication module such as a BLE module can be used for device discovery for the multi-camera session. For example, devices participating in the session can discover each other using the communication module, and devices can pair using this communication module. In particular embodiments, as explained more fully below, a multi-camera session may use a peer-to-peer connection network, so that if there are N devices in the session, then each device has N−1 connections (i.e., each device is connected to every other device). In particular embodiments, fewer than all of the devices may be connected to every other device in the session, with the minimum requirement that each device be connected to one other device in the session.

Step 130 of the example method of FIG. 1 includes determining, by the camera device, a position of the camera device relative to at least one of one or more peer camera devices capturing video of a scene in the environment of the camera device. In particular embodiments, each camera device in a multi-camera session may determine its location in the session relative to the other devices in that session. FIG. 2 illustrates device 205 and device 210 as each having an ultra-wideband (UWB) transceiver for detecting relative position, although other localization techniques (such as near-range localization techniques) can be used, such as Wi-Fi localization, visual localization, etc. In particular embodiments, as shown in FIG. 2, the data from a localization module may be passed to a positioning module, which uses the sensor data to determine that device's position relative to one of more of the other devices in the session.

Step 140 of the example method of FIG. 1 includes capturing, by the camera of the camera device, a video of the scene in the environment of the camera device. As explained above, the video is captured using the camera parameters applied in step 120 of the example method of FIG. 1. FIG. 2 illustrates an example in which video is captured by one or more cameras of device 205 and one or more cameras of device 210, and this video is passed to respective video encoder/decoders on each device. As illustrated in the example of FIG. 2, in particular embodiments audio may be captured by a microphone on a camera device and transmitted to an audio encoder/decoder on the camera device.

Step 150 of the example method of FIG. 1 includes transmitting, by the camera device, captured video of the scene to at least one of the one or more peer camera devices to form a composite video of the scene. Video and any audio captured by a camera device may be used for multiple purposes. For instance, as illustrated in the example of FIG. 2, encoded video and audio captured by a camera device may be passed to a transceiver on that device, such as a Wi-Fi direct transceiver, and the encoded video and audio may then be communicated to one or more other camera devices in the session. Received video and audio may then be decoded by the receiving device's video and audio decoder.

In particular embodiments, video and audio data may be divided into chunks of fixed length, e.g., 1 second worth of video and audio data, and these chunks may be encoded and transmitted to (and received from) other camera devices in the session. Transfer of chunked data may happen in real-time, i.e., as the video is being captured during the multi-camera session. Transfer of video and audio may also, or alternatively, occur after the recording is completed. In particular embodiments, either or both of video and audio may have a lower quality when transferred in real time and may have a higher quality (e.g., the full resolution and frame rate specified by the camera parameters) when transferred after the recording is complete.

In particular embodiments, video captured by a camera device and received from other camera devices may be available for presentation on a user interface (UI) displayed by a display of the camera device, and audio captured by the device and received from other camera devices may be played through a speaker of the camera device. This presentation may be made in real time, so that users can view and hear the recording as it happens. In particular embodiments, a user can switch among all the video and audio streams in real-time, so that the user can view the multi-camera video from the perspective of any of the camera devices in the multi-camera session during the recording.

Figure 3:
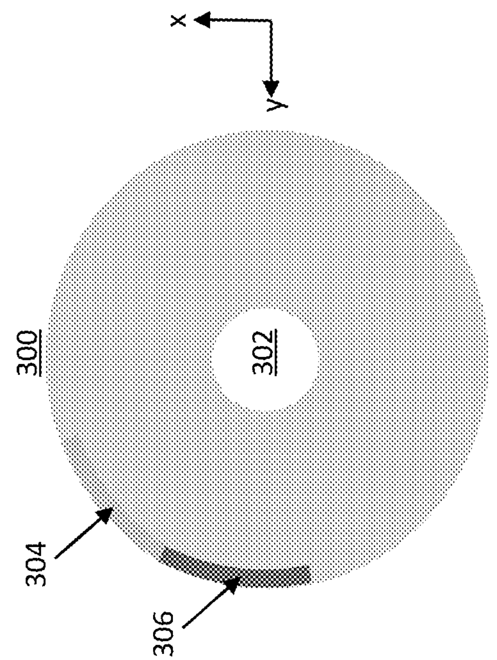
FIG. 3 illustrates an example interactive element for switching among captured videos of a scene.
Figure 3:
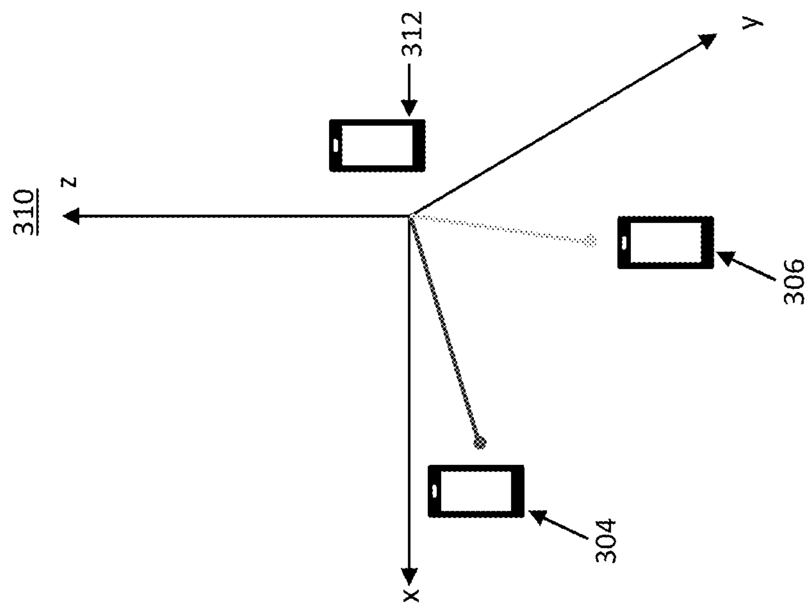

In particular embodiments, a user interface of a camera device may display an interactive element for switching among the camera device's captured video of the scene and video of the scene received from other camera devices in the multi-camera session. In particular embodiments, the interactive element may show the position of the user's camera device relative to other camera devices, so that the user can intuitively and quickly move to a stream from a particular perspective, without having to create or identify camera-device names in the session. FIG. 3 illustrates an example of an interactive element 300 for switching among captured video of the scene. In the example of FIG. 3, the position of the user's camera device is represented by icon 302, which is at the center of the interactive element 300. Other camera devices in the session are identified at the outer edge of interactive element 300 by identifiers 304 and 306. Here, identifier 304 represents one camera device, and identifier 306 represents another camera device.

The position of the identifiers relative to center 302 of interactive element 300 corresponds to the relative position of the camera devices in physical space relative to the user's camera device. Diagram 310 illustrates an example of the relative position of camera devices in physical space. Diagram 310 corresponds to interactive element 300: device 312 corresponds to icon 302, device 314 corresponds to identifier 304, and device 316 corresponds to identifier 306. The arbitrarily defined x and y directions are shown in diagram 310 and next to interactive element 300, and these directions correspond to each other. As illustrated in FIG. 3, the positions of identifiers 304 and 306 in interactive element 300 relative to center icon 302 corresponds to the positions of devices 314 and 316 relative to device 312 in physical space. As a result, user interface 300 provides positional information to a user so that the user can select among video streams from various perspectives. For example, a user may select an identifier (e.g., by tapping the identifier) to view and hear a video and audio stream from the perspective of the camera device corresponding to that identifier.

In particular embodiments, the azimuth angle (e.g., the angle from the x-axis to the direction of orientation of device 312 in the x-y plane) may be obtained from an ultra-wideband module on the camera device. In addition, IMU data and/or data from a magnetometer be used to identify the z-component of the orientation of device 312, and this z component may be used to calculate the azimuth angle on the horizontal x-y plane.

In particular embodiments, when two identifiers would overlap in an interactive element, then the identifiers may automatically be moved in opposite directions (e.g., by half the overlapping amount), until the identifiers no longer overlap. In particular embodiments, if three or more identifiers overlap, then all but two of the overlapping identifiers may be fixed while the remaining two are moved until they no longer overlap, and this process may iteratively repeat until all the identifiers no longer overlap. In particular embodiments, a size of the identifiers may vary based on the number of identifiers and/or on an amount of overlap of the identifiers, e.g., so as to reduce overlap of identifiers.

While FIG. 3 illustrates an example format of an interactive element for selecting among video and audio streams, this disclosure contemplates that any suitable format may be used. For example, the interactive element and/or identifiers may take a different shape, the interactive element may be provided as a three-dimensional object (e.g., a sphere) if the user is viewing three-dimensional content, etc.

In particular embodiments, video from multiple camera devices in a multi-camera session may be automatically consolidated into a single composite video that can switch among the various perspectives. In particular embodiments, one or more AI models may be used to automatically create the composite video. For instance, in the example of FIG. 2, an AI composite optimizer module may receive as input the video captured locally by its camera device and the video received from other camera devices in the session. In particular embodiments, this input video may be a high-quality version of the video (i.e., the video quality is not reduced from its native quality, as may occur in order to transfer video in real-time). For example, upon completion of a recording session, each camera device in the session may transmit its recorded video in high-quality form to every other camera device in the session. The AI composite optimizer module may then automatically generate a video of the scene by selecting sequential frames from among the various perspectives, which may be stitched together by a video/audio stitching module to form the composite video. As explained more fully below, a user can edit this automatically generated video, and/or can separately create a composite video from scratch. In addition, each user may have different preferences for a composite video, and therefore composite video generated by one user's device may be different than the composite video generated by another user's device.

Figure 4:
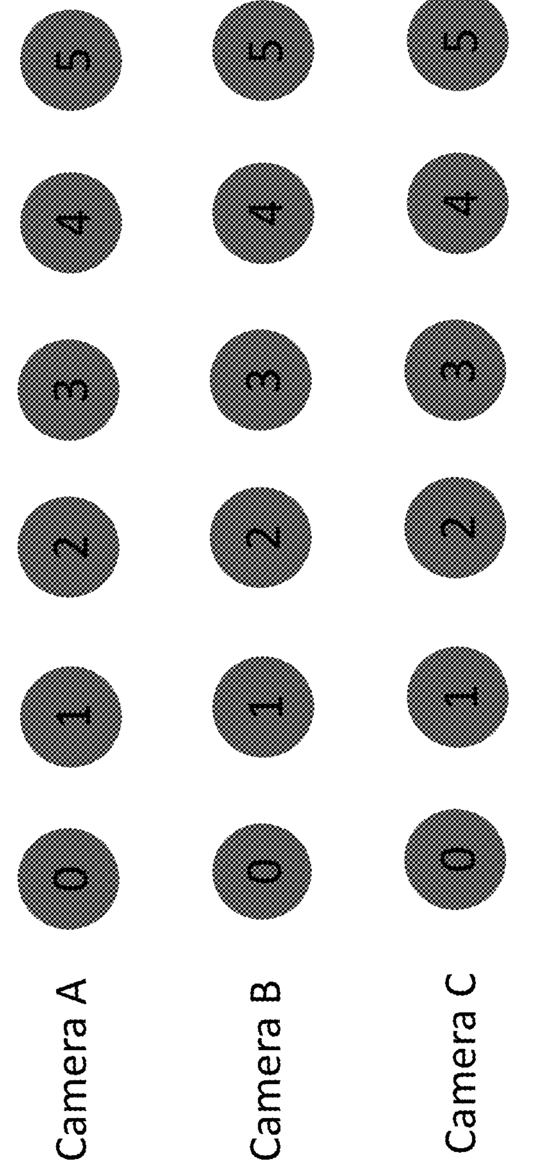
FIG. 4 illustrates an example section of a graph representation that includes video from three cameras.

In particular embodiments, when automatically creating a composite video, each input video may be divided into chunks, e.g., chunks of 1 second in length, although any other length may be used. Each chunk may include the frames in that chunk and any metadata (e.g., timestamps, audio, etc.) corresponding to those frames. The videos may be represented in a graph format, with each chunk representing a node in the graph. In the graph, moving from one chunk (node) to another chunk represents an edge between those two nodes. FIG. 4 illustrates an example section of a graph that includes video from three cameras: camera A, camera B, and camera C. Each node represents a chunk of video and related metadata from the camera in the corresponding row. In the example of FIG. 4, columns in the graph represent content at a particular time; e.g., node 0 for camera A corresponds to the same timeframe as does node 0 for camera B and node 0 for camera C. As explained above, this correspondence may be ensured by having each camera device synchronize its device clock when joining the multi-camera session.

In the example of FIG. 4, a particular consolidated video can be identified by the sequence of nodes in that video. Each node may be identified by its camera device and its node number. For example, a video that uses nodes 0, 1, and 2 from camera B, switches to nodes 3 and 4 from camera A, and then switches to node 5 from camera C may be represented by B:0-2, A:3-4, C:5. The composite video includes the video frames and audio as identified by the path (sequence of nodes) the in graph. In addition, the path in the graph results in a series of edges representing the path; for instance, in the preceding example, edges are created between each neighboring node in the path. The edges may be directional, indicating the temporal sequence of the composite video. While the example of FIG. 4 illustrates a graph that contains a node at each time from each camera device, camera devices may join or leave (or become disconnected from) a session while the session is occurring, and as a result, certain camera devices may have missing nodes in the graph corresponding to times when that camera device was not capturing the scene or was otherwise not part of the session.

In particular embodiments, a composite video may be automatically created using an objective function that evaluates potential paths through the graph and selects a path (which determines a composite video) that optimizes (e.g., minimizes or maximizes) an objective function. For example, an objective function may include one or more of a node term $R_{Node}$, an edge term $R_{edge}$, and a duration term $C_{duration}$. In particular embodiments, each term in the objective function may be summed in order to evaluate the objective function for a particular path. In particular embodiment, each term in the objective function may be weighted, e.g., so that cost function C is given by $C=\alpha R_{Node}+\beta R_{edge}+\gamma C_{duration}$.

A node term $R_{Node}$ may provide a reward or impose a penalty based on the contents of the node (e.g., based on the contents of the video chunk and associated metadata). In particular embodiments, a node term's value may be determined based on semantic segmentation and saliency prediction on the node contents. For example, semantic segmentation may be used to identify objects in the frames of the video chunk. The objects may be identified at various levels of granularity (e.g., "person," "female," "female wearing a headset"), depending on the segmentation technique used. Once semantic segmentation is performed, particular embodiments may use saliency prediction on one or more node frames to determine a value for that node's node term in the objective function. For example, particular embodiments may determine saliency prediction based on a frequency of appearance (and/or a prominence of appearance) of humans or pets in a video. Particular embodiments may determine saliency based on a frequency of appearance (and/or a prominence of appearance) of human or pet faces in a video frame.

In particular embodiments, saliency may be based on a frequency of appearance of humans or pets that are familiar to the user, for example as determined by the appearance of those entities in the user's photo gallery. For example, to calculate the ranking of faces in a particular user's photo gallery, particular embodiments may use EMA (Exponential Moving Average) for calculating the frequency of recognized faces in the photo gallery. Faces that appear in more recent media (e.g., photos, videos) may be given a relatively higher weight than faces that appear in less recent media. For one recognized person A in photo gallery, given a window size w=30 months, meaning that this example considers faces recognized within last 30 months, then the frequency of A's appearance in the $i^{th}$ month is given by:

$$f_i = \frac{\text{count}(frameIncludeA) + \text{count}(PhotosIncludeA)}{\text{count}(framesIncludePerson) + \text{count}(photosIncludePerson)}$$

The weighted average of A's appearance in the window is:

$$f = \frac{\sum_{i=1}^{W} f_i * \text{factor}^i}{\sum_{i=1}^{W} \text{factor}^i}$$

Assuming we have N recognized people in the user's photo gallery, then:

$$A's \text{ Saliency factor} = \frac{f}{\sum_{j=1}^{N} f_j}$$

Thus the saliency factor for A will be between [0, 1]. Particular embodiments may set a threshold saliency factor T, so that any person with saliency factor less than T will round up to T, e.g., to avoid a long-tail scenario for faces detected. This threshold T may then be used as weights for unrecognized people faces when evaluating the objective function.

Assuming N faces are detected in one frame, then:

$$\text{face saliency reward} = \frac{\sum_{i=1}^{N} f_i * \text{area}_i}{\sum_{i=1}^{N} f_i},$$

Where $f_i$ represents the saliency factor for ith face detected, and:

$$f_i = \begin{cases} T, & ith \text{ face is not among recognized faces} \\ \text{saliency factor of } i, & ith \text{ face is among recognized faces} \end{cases}$$

The facial appearance reward for a node is then the weighted sum of faces that appear in the frames of that node:

$$R_{Node,facial\ appearance} = \sum_{i=0}^{N} f_i \times A_i$$

Where $f_i$ is a saliency factor, $A_i$ is an area of a segmented face, and $A_i$ is calculated from semantic segmentation on video frame.

In particular embodiments, a similar approach may be used for an appearance of humans or pets in a video, regardless of faces. In particular embodiments, saliency may be based on an appearance of humans or pets without regard to how familiar those humans or pets are to the user. As illustrated in the example the preceding paragraphs, in which saliency is determined based on a familiarity to a particular user, different users may have different automatically created composite videos from the same multi-camera session. For example, multiple users attending a party, dance, or other social event may record video of the event and share the video in a multi-camera session, even those the users may not all know each other to the same extent, or even at all. Different users at the event may have different automatically created composite videos, which may include frames from a camera device of any user at the event, if those frames result in an optimized objective function for the particular user for whom the composite video is being created.

In particular embodiments, a saliency factor may be based on whether a person is talking. This saliency factor may depend on the type of video, e.g., a video of a conversation or an interview may use this kind of saliency factor, or give this saliency factor relatively more weight, to determine a node term for an objective function.

Figure 5:
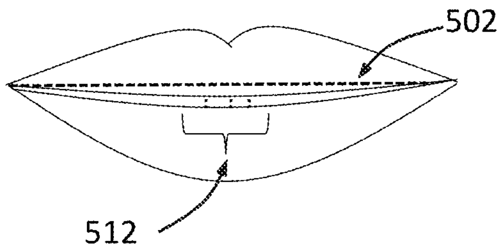
FIG. 5 illustrates examples of estimating an openness of a mouth.
Figure 5:
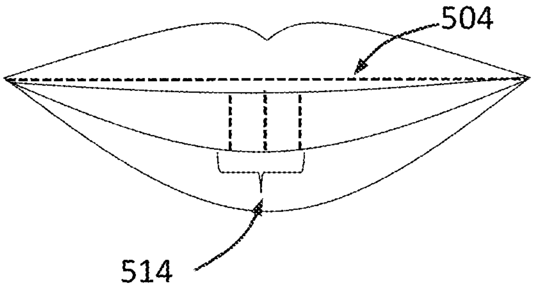
Figure 5:
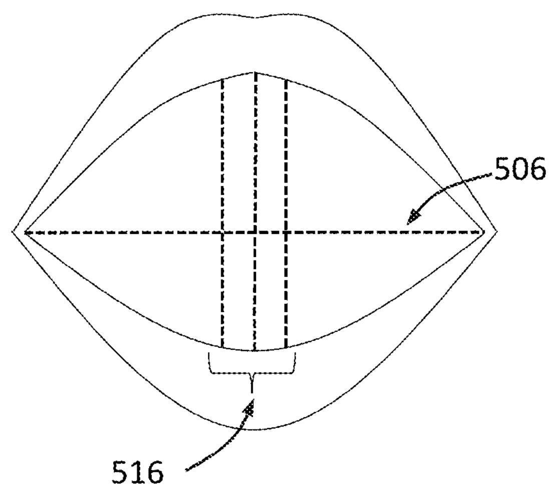

A person-talking saliency factor may be based on a prediction that a person's mouth is open. Mouth openness may indicate a user's mouth movement either due to speaking or due to facial expressions. To predict mouth openness, particular embodiments may use the following approach:

$$w = \frac{\sum_{i=1}^{M} \|\text{landmark}_{leftcorner} - \text{landmark}_{rightcorner}\|}{M}$$

Where w is the mouth width and M is the window size for calculating mouth width. FIG. 5 illustrates example mouth widths 502, 504, and 506 in three different scenarios. In the example of FIG. 5, the leftcorner landmark is left edge of the mouth, and the rightcorner landmark is the right edge of the mouth. Here, w is normalized by the mouth width to reduce the discrepancy from depth. Then:

$$l = \frac{\sum_{i=1}^{n} \|\text{landmark}_{upperlip\_i} - \text{landmark}_{lowerlip\_i}\|}{w * n}$$

where l is the lips vertical distance, taking the average of n (e.g., 3) landmarks from the middle of the lips. FIG. 5 illustrates examples 512, 514, and 516 of l where n is three. Then mouth openness o can be determined by:

$$o = \frac{\sum_{i=1}^{N} (l_i - \mu)^2}{N}$$

where N is the window size. In particular embodiments, a relatively high variance of mouth vertical distance indicates an active mouth movement within the window, which may result in a high saliency.

In particular embodiments, a saliency for a node term may be based on a prediction of where the viewer's attention should be in the video. For example, instructional or how-to videos often utilize a camera that captures images of a person's face and a camera that captures images of the person's hands. These cameras typically point in different, and often perpendicular, directions. A node term may be based on determinations of whether a speaker is facing forward (i.e., facing a camera), whether a speaker is talking, and whether a speaker's hands are moving. The first two determinations suggest that the viewer's attention should be on the speaker's face, while the third determination suggests that the viewer's attention should be on the speaker's hands. For example, a node term may be given by:

$$R_{Node} = \alpha C_{Node,face\ direction} + \beta C_{Node,talking\ person} + \gamma C_{Node,motion\ detection}$$

In particular embodiments, a durational term for this type of video may have only a lower bound, as discussed more fully below, so that a composite video does not change views in the middle of a person speaking or in the middle of a demonstration.

In particular embodiments, $C_{Node,\ motion\ detection}$ may be based on an amplitude or frequency of motion, or both. $C_{Node,\ face\ direction}$ may be based on head-pose estimation, which may use face-mesh detection to detect 2D or 3D facial landmarks using the face center as the origin. Then, in order to get the face-forward direction with respect to the camera coordinate frame, embodiments may use at least 6 landmarks from the face mesh detection to calculate the transformation from face frame to camera frame. Then the rotation about x axis (row) represents the tilting up and down of face, and rotation about y axis (pitch) represents the left and right rotation of face. If the person is facing straight at the camera, both row and pitch should be 0. Face direction cost may then be the weighted sum of row and pitch angles of a user's face, i.e.:

$$C_{Node,Face\ Direction} = W_{row} * \theta + W_{pitch} * \psi$$

The node term may then be determined based on the face direction, whether a person is talking (which may be determined as described above), and motion of the user's hands. For example, if a person is looking at the camera and speaking without hand motion, then nodes from a camera facing the person would receive a relatively high reward. In contrast, if the person is looking down and moving their hands, then nodes from a camera directed at the person's hands would receive a relatively high reward.

In particular embodiments, an edge term may be used for an objective function. An edge term may represent a non-temporal cost or reward for switching between perspectives within the video. For example, viewers may prefer a video that keeps objects in the scene on the same side of the scene, i.e., the perspective ranges by up to 180 degrees. Otherwise, for example, spatial "left" may become spatial "right" when a view moves more than 180 degrees, which can be disorienting and confusing to a viewer. Therefore, particular embodiments may provide a reward for moving between nodes that stay with a specified 180 degree range or may impose a cost for moving between nodes that deviate from the range, or both. As another example, a reward or a cost may be imposed when depths between two views change by greater than a threshold amount. In particular embodiments, the edge term, including whether it represents a reward or a cost, may vary based on the content of the video. For example, an action video may reward transitions between close-up shots and far away shots.

Particular embodiments may use a duration term in an objective function in order to automatically generate a composite video from multiple perspectives. Here, duration refers to how long a video stays in a particular perspective (e.g., how long the nodes describing a portion of a video stay in one row, in the example of FIG. 4). In particular embodiments, the duration term regulates the frequency of switching between different perspectives. As described below, the duration term can reward switching between different perspectives or penalize switching between different perspectives, or both. Moreover, in particular embodiments, a duration term may vary based on the type of video or the video content. For example, as described below, videos showing people talking may set a lower bound regulator (to avoid relatively high-frequency switching between speakers) but not a higher bound regulator (in order let a video focus on a speaker until the speaker is done talking, without encouraging moving to another perspective while the speaker is talking).

Figure 6:
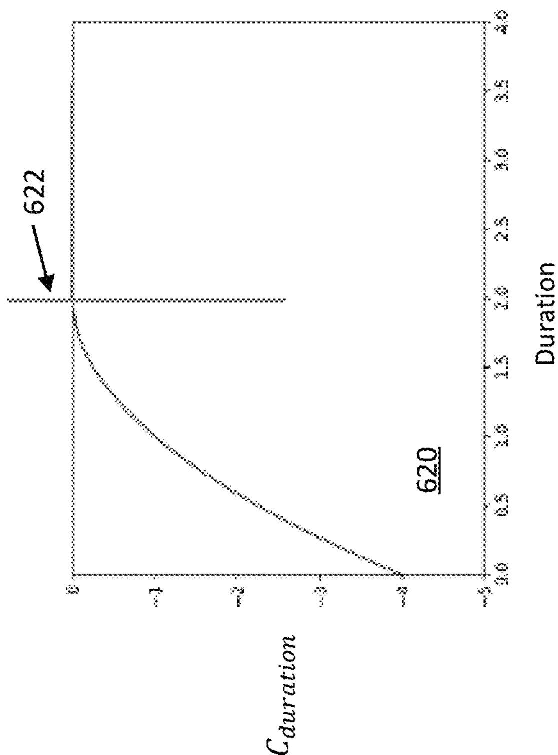
FIG. 6 illustrates an example graph of a duration term of an objective function.
Figure 6:
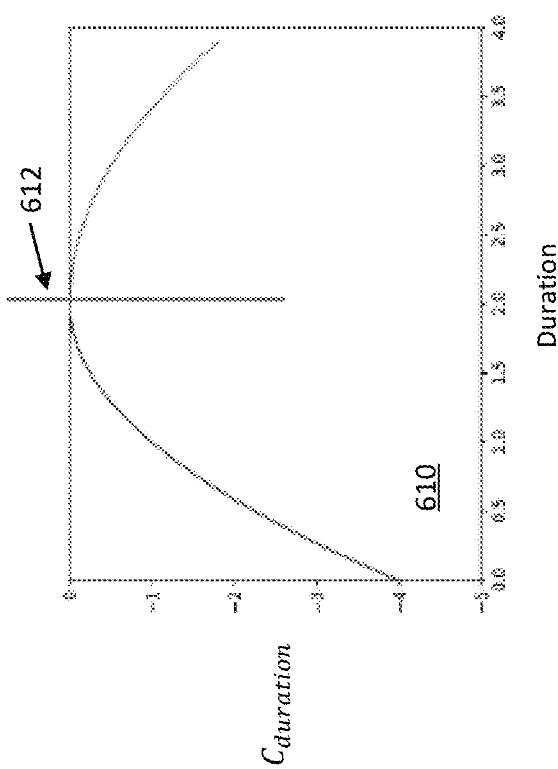

In particular embodiments, a duration term for an objective function may include a lower bound, which imposes a reward or a cost when the video maintains a particular perspective. For example, a lower bound for a duration term d may be represented by $\alpha_1(d-E(d))^2$ while $d<E(d)$. Here, $\alpha_1$ is a parameter that can be set by a user, can be set automatically (e.g., by an AI algorithm), and can be based on the content of a video. E(d) is the average (or expected average) clip duration, where clip duration refers to the duration of a continuous video segment that does not include cuts. As explained herein, average clip duration may depend on the type or category of a video. A duration term for an objective function may also include an upper bound, which imposes a reward or a cost when a duration exceeds some threshold. For example, an upper bound for a duration d may be represented by $\alpha_2(d-E(d))^2$ when $d\geq E(d)$. Here, $\alpha_2$ is a parameter that can be set by a user, can be set automatically (e.g., by an AI algorithm), and can be based on the content of a video. Graph 610 of FIG. 6 illustrates an example graph of a duration term having the lower and upper bound described above. The maximum of the duration term in this example is illustrated by vertical line 612, with points on the left of line 612 illustrating the form of the lower bound and points to the right illustrating the form of the upper bound.

In particular embodiments, a duration term may have no lower bound or may have no upper bound, and graph 620 of FIG. 6 illustrates an example of a duration term that has the lower bound described above and has no upper bound (i.e., the duration term is 0 when d≥E(d)). Line 622 illustrates the division between the lower threshold and the upper threshold (which corresponds to zero, in this example).

While the examples above describe a particular functional form and threshold for example duration terms, this disclosure contemplates that any suitable functional form and threshold may be used. For example, a threshold may not be based exclusively or at all on E(d), and instead may be a constant or may be another variable, either of which may vary based on the type or content of a video. For example, an action-heavy video may start rewarding switching perspectives after a certain period of time, e.g., 2 seconds.

A duration term may be based on one or more heuristic rules or may be determined by inputting a video into a trained machine-learning model, which identifies the type of video and, in particular embodiments, selects a corresponding duration term. For example, a machine-learning model may be trained based on training videos and ground-truth content labels and corresponding duration terms. The duration terms may be updated automatically based on, for example, user adjustments to videos (e.g., videos of a certain type). For example, if users consistently manually edit an automatically created composite video to reduce the frequency of switching, then a duration term for videos of the same type may be updated with a greater penalty (or with less reward) for frequent switching. In particular embodiments, a user can identify a label for a video (e.g., action, speaking, etc.) and a corresponding predetermined durational term for that label can be used for the objective function.

In order to embed a duration term so that the term can be included when evaluating an objection function, particular embodiments may create a graph in which an edge exists between each node and all temporally subsequent nodes from other camera footages in the graph. For instance, in the example of FIG. 4, an edge would be created between node B0 and each temporally subsequent node from other cameras (e.g., A1, A2, . . . An, C1, C2, . . . Cn), but no edge would be created to nodes from the same camera (e.g., no edge would be created from B0 to B1, B2, . . . , Bn, etc.) or to temporally equivalent nodes (e.g., no edge would be created between B0 and A0 or B0 and C0, etc.). Using the edges in this graph, the duration cost can be evaluated by the time duration temporarily staying on the same camera track. For instance, to evaluate a duration for the path B0→A3 in the example graph of FIG. 4, a duration may be evaluated by staying on camera B track for B0, B1, B2 for a total of 3 unit length, and a transition cost may be evaluated that connects B2 to A3. In particular embodiments, dynamic programming may be used to determine the maximum reward path, as the resulting number of edges in this graph may be quite large. For example, particular embodiments may use a hash table to remember the maximum reward from each node to a dummy end node, and the next node on the maximum reward path for each node.

In the example of FIG. 4, the node term is evaluated at every node, the edge term is the transition cost where switching between camera tracks happens, and the duration cost is related to how long a certain path through the graph stays on one camera track. If a dummy start node and a dummy end node is added to the example of FIG. 4, the candidate path cost for Start→B0→A3→End will, in one formulation of the objective function, be the following: $R_{Node}$(B0)+$R_{Node}$(B1)+$R_{Node}$(B2)+$R_{Node}$(A3)+$R_{Node}$(A4)+$R_{Node}$(A5)+$R_{Edge}$(B0→A3, although the actual switch happens at B2→A3)+$C_{Duration}$(3 unit length B0→B2)+$C_{Duration}$(3 unit length A3→A5). This example candidate path is just 1 possible path from start to end, as B can connect to all temporally succeeding nodes from other cameras (i.e., A1~A5 and C1-C5) including the dummy end node. In an instance in which B0 directly connects to dummy end node, this means that the video stays in the camera B track during the entire video composite.

While the examples above describe node (or content) terms, edge terms, and duration terms for an objective function in the context of a graph, this disclosure contemplates that the same techniques (e.g., semantic segmentation, saliency prediction, etc.) may be used for an objective function for any similar representation of videos of a multi-camera session to create a composite video. In particular embodiments, the reward or penalty of a term in an objective function, or the weighting of an objective function, or both, may be adjusted based on user preferences.

Figure 7:
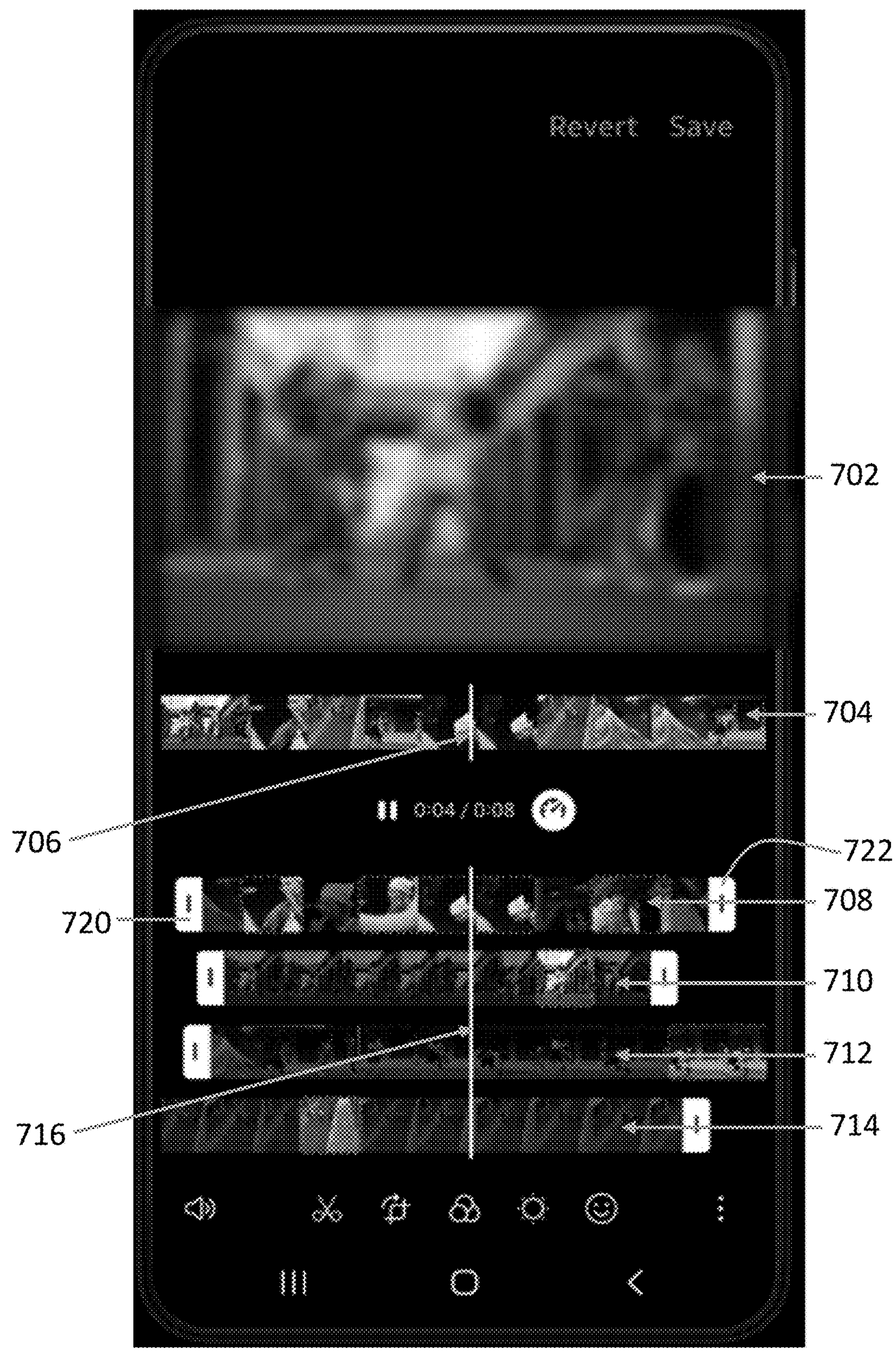
FIG. 7 illustrates an example user interface for editing and creating a composite video.

In particular embodiments, a user can manually create a composite video and/or can manually edit a previously created composite video, such as an automatically created composite video. FIG. 7 illustrates an example user interface for editing and creating a composite video. The example user interface of FIG. 7 includes a frame 702 displayed on a device for editing or creating a composite video. Segment 704 of the user interface illustrates frames from the composite video as currently constructed. Line 706 illustrates the user's current temporal position in the video, i.e., frame 702 corresponds to the location of line 706 in the video. In particular embodiments, when a user opens the user interface and loads a video from a session, segment 704 may initially be an automatically created composite video, such as a video created using one or more of the techniques described above.

Segment 708 illustrates a video stream from a particular camera device (e.g., camera device A). Segments 710, 712, and 714 illustrate video streams from other particular camera devices (e.g., devices B, C, and D, respectively). Line 716 illustrates the current temporal location of frame 702 in those video streams, which are all synchronized in time with each other. In the example of FIG. 7, segments 708, 710, 712, and 714 have different lengths, each length illustrating the time that each camera device recorded video (e.g., each device began recording as indicated by the beginning of the segment and stopped recording as indicated by the end of the segment).

A user interface may visually identify the portion of each video segment that corresponds to (is used in) the composite video. For example, if a portion of a video segment is used in the composite video, then that portion may be emphasized (e.g., highlighted, magnified, presented with a bounding box, etc.) in that segments row.

In particular embodiments, a user may edit the composite video by identifying clips of video segments to use in the composite video. For example, each segment may have a left editing bar (e.g., bar 720) and a right editing bar (e.g., bar 722). A user may move bar 720 and/or bar 722 to select a portion of a video segment (in this example, a portion of video segment 708). The user may then drag the identified portion to the composite video segment 704, resulting in the identified portion being used in the corresponding temporal position in the composite video segment. After placement in the composite video, the left and right editing bars may return to their original positions. In particular embodiments, portions of video segments manually identified by a user for use in a composite video may be emphasized differently than portions of video segments automatically identified for use in the composite video. For example, automatically identified portions may be identified by a particular bounding box (e.g., a blue dashed line around the automatically identified portion), while manually identified portions may be identified by another bounding box (e.g., an orange dashed line around the manually identified portion).

As described above, embodiments of this invention provide for seamless capture, review, editing, and compilation of video and audio captured by multiple camera devices. The techniques described herein may be used to capture any kind of video, including interview-type videos, educational or training videos, videos of events such as weddings, videos of performances (e.g., sports, dances, etc.), and any other type of video using multiple perspectives.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1. Moreover, this disclosure contemplates that some or all of the computing operations described herein, including certain steps of the example method illustrated in FIG. 1, may be performed by circuitry of a computing device described herein, by a processor coupled to non-transitory computer readable storage media, or any suitable combination thereof.

Figure 8:
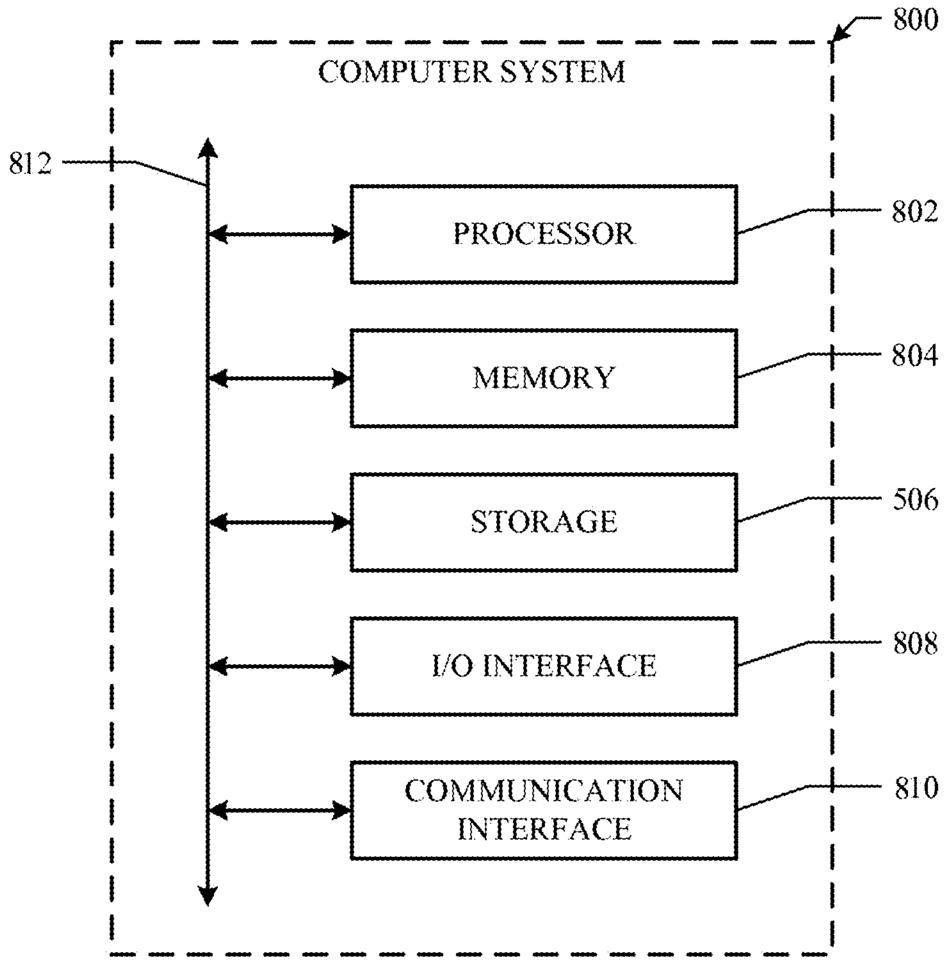
FIG. 8 illustrates an example computing system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:

synchronizing, by a camera device, a clock of the camera device to a shared clock time;

applying, by the camera device, one or more shared camera parameters to a camera of the camera device, wherein the shared camera parameters comprise camera parameters of a primary camera device;

determining, by the camera device, a position of the camera device relative to at least one of one or more peer camera devices capturing video of a scene in an environment of the camera device, wherein at least one of (1) the one or more peer camera devices or (2) the camera device comprises the primary camera device, and each of the one or more peer camera devices and the camera device that is not the primary camera device comprises a secondary camera device;

capturing, by the camera of the camera device, a video of the scene in the environment of the camera device; and transmitting, by the camera device, the captured video of the scene to at least one of the one or more peer camera devices to form a composite video of the scene.

2. The method of claim 1, wherein the camera device and each of the one or more peer camera devices comprises a smartphone.

3. The method of claim 1, wherein:

the camera device comprises a primary camera device; and the one or more peer camera devices each comprises a secondary camera device.

4. The method of claim 1, wherein:

a first one of the one or more peer camera devices comprises a primary camera device; and the camera device comprises a secondary camera device.

5. The method of claim 1, wherein the camera device and each of the one or more peer camera devices are connected to every other camera device in a peer-to-peer network, the method further comprising:

transmitting, by the camera device, the captured video of the scene to each of the one or more peer camera devices; and receiving, at the camera device, a respective video captured by each of the one or more peer camera devices.

6. The method of claim 5, further comprising displaying on a display of the camera device (1) a real-time video of the scene and (2) an interactive element for switching, in real time while capturing video of the scene, among the camera device's captured video of the scene and the received respective videos of the scene.

7. The method of claim 6, wherein the interactive element comprises:

a top-down representation of the scene, wherein a center of the top-down representation corresponds to a relative position of the camera device; and one or more selectable elements each corresponding to a respective video from a respective peer camera device, wherein a location of each selectable element relative to the center of the top-down representation corresponds to a relative location between the respective peer camera device and the camera device.

8. The method of claim 5, further comprising:

transmitting, in real-time during the video capture, a low-fidelity instance of the captured video of the scene to each of the one or more peer camera devices; and transmitting, after completion of the video capture, a high-fidelity instance of the captured video of the scene to each of the one or more peer camera devices.

9. The method of claim 5, further comprising generating, based on the captured video of the scene and the received respective videos of the scene captured by each of the peer camera devices, a composite video of the scene.

10. The method of claim 9, wherein:

each video of the scene is represented as a plurality of nodes in a graph, each node corresponding to a fixed length of video; and generating the composite video of the scene comprises determining, from the graph, a sequence of nodes in the graph that optimizes an objective function.

11. The method of claim 10, wherein the objective function comprises a node term that is based on the content of each node in the sequence of nodes.

12. The method of claim 11, wherein the node term is based on (1) a semantic segmentation of one or more video frames corresponding to each node in the sequence of nodes and (2) a saliency prediction for each node in the sequence of nodes, wherein the saliency prediction is based on the semantic segmentation.

13. The method of claim 12, wherein the saliency prediction is based on the presence of one or more faces in the one or more video frames corresponding to each node in the sequence of nodes.

14. The method of claim 10, wherein the objective function comprises an edge term $R_{edge}$ that is based on a connection between each node and its temporal succeeding nodes.

15. The method of claim 10, wherein the objective function comprises a duration term that is based on a number of consecutive nodes, in the sequence of nodes, that are each associated with a single one of the camera devices.

16. The method of claim 15, wherein the duration term is further based on a determined content of the video.

17. One or more non-transitory computer readable storage media storing instructions and coupled to one or more processors that are operable to execute the instructions to:

synchronize a clock of a camera device to a shared clock time;

apply one or more shared camera parameters to a camera of the camera device, wherein the shared camera parameters comprise camera parameters of a primary camera device;

determine a position of the camera device relative to at least one of one or more peer camera devices capturing video of a scene in an environment of the camera device, wherein at least one of (1) the one or more peer camera devices or (2) the camera device comprises the primary camera device, and each of the one or more peer camera devices and the camera device that is not the primary camera device comprises a secondary camera device;

capture, by the camera of the camera device, a video of the scene in the environment of the camera device; and transmit, from the camera device, the captured video of the scene to at least one of the one or more peer camera devices to form a composite video of the scene.

18. The media of claim 17, wherein the camera device and each of the one or more peer camera devices comprise a smartphone.

19. A camera device comprising:

a camera; and one or more non-transitory computer readable storage media storing instructions; and one or more processors coupled to the non-transitory computer readable storage media, the one or more processors operable to execute the instructions to:

synchronize a clock of the camera device to a shared clock time;

apply one or more shared camera parameters to the camera of the camera device, wherein the shared camera parameters comprise camera parameters of a primary camera device;

determine a position of the camera device relative to at least one of one or more peer camera devices capturing video of a scene in an environment of the camera device, wherein at least one of (1) the one or more peer camera devices or (2) the camera device comprises the primary camera device, and each of the one or more peer camera devices and the camera device that is not the primary camera device comprises a secondary camera device;

capture, by the camera of the camera device, a video of the scene in the environment of the camera device; and transmit, from the camera device, the captured video of the scene to at least one of the one or more peer camera devices to form a composite video of the scene.

20. The camera device of claim 19, wherein the camera device and each of the one or more peer camera devices comprise a smartphone.

* * * * *